United States Patent [19]

Burris

[11] 4,073,659

[45] Feb. 14, 1978

[54] ASPHALT-GILSONITE EMULSION

[76] Inventor: Michael V. Burris, 3004 Campbell Circle, Las Vegas, Nev. 89107

[21] Appl. No.: 726,945

[22] Filed: Sept. 27, 1976

Related U.S. Application Data

[63] Continuation-in-part of Ser. No. 686,733, May 17, 1976.

[51] Int. Cl.² .................. C08L 95/00; C09D 3/24
[52] U.S. Cl. .................. 106/277; 106/273 N; 106/278
[58] Field of Search .................. 106/273 N, 277, 278

[56] References Cited

U.S. PATENT DOCUMENTS

| | | | |
|---|---|---|---|
| 1,733,493 | 10/1929 | Kirschbraun | 106/277 |
| 2,558,402 | 6/1951 | Wallace | 106/277 |
| 2,730,506 | 1/1956 | Sommer | 106/277 |
| 3,050,468 | 8/1962 | Wright | 106/277 |
| 3,098,094 | 7/1963 | Pitchford | 106/273 N |
| 3,418,249 | 12/1968 | Pitchford | 106/277 |
| 3,432,321 | 3/1969 | Rostler | 106/277 |
| 3,445,258 | 5/1969 | Ferm et al. | 106/277 |
| 3,592,788 | 7/1971 | Rostler | 106/277 |

*Primary Examiner*—Herbert J. Lilling
*Attorney, Agent, or Firm*—Seiler & Quirk

[57] ABSTRACT

An improved asphalt emulsion composition comprises between about 10 and about 33% by weight gilsonite and between about 66 and about 90% by weight asphalt preferably having a penetration below 100, and preferably below about 75 dmm at 77° F, a small amount of emulsifying agent, and water with the ratio of asphalt phase:water being between about 1:1 and 2:1 by weight, respectively.

7 Claims, No Drawings

ASPHALT-GILSONITE EMULSION

This application is a continuation-in-part of my application Ser. No. 686,733, filed May 17, 1976.

BACKGROUND OF THE INVENTION

In my co-pending application, there is disclosed a gilsonite containing asphalt emulsion composition in which the asphalt used is a cutback rapid curing liquid asphalt utilizing naphtha. The compositions exhibit unexpected skid resistant properties in a surface paving composition. The present invention is directed to a similar asphalt emulsion composition having superior properties for slow traffic areas where skid resistance is not so critical, for example, parking lots, driveways and the like. The major distinction of the composition from that described in my previous application is the use of a penetration grade asphalt which has not been cutback, and preferably one which has a relatively low penetration as will be more particularly pointed out hereinafter.

DETAILED DESCRIPTION OF THE INVENTION

The asphalt emulsion composition of the invention comprises utilizing a non-cutback asphalt or penetration grade asphalt mixed with gilsonite to produce an asphalt composition which is then emulsified. The asphalt is one preferably having a low penetration although higher penetration asphalts may be used with the addition of more gilsonite. Penetration grade asphalts are those which have a penetration of between about 40 and about 300 dmm at 77° F (25° C), 100 g/5 sec. However, preferably, the asphalt has a penetration of below 100 dmm and more preferably below about 75 dmm. Most preferred asphalt have penetrations of 40–70 and it will be recognized that such compositions are relatively hard. It is for this reason that these low penetration asphalt have not been used in preparing emulsions unless compounded as cutbacks.

As previously noted, the asphalt and gilsonite are mixed to form an asphalt phase which is then emulsified to form the final composition. However, in order to mix the gilsonite and asphalt, both must be independently heated to a temperature above about 300° F and then thoroughly mixed at the elevated temperature. The gilsonite and asphalt may be mixed to achieve a 10–33% by weight gilsonite in the mixture. Preferably, where asphalt penetrations are below about 100 dmm, the ratio of asphalt:gilsonite is between about 6:1 and about 10:1. However, for some compositions, the asphalt:gilsonite ratio may be around 4:1 and even 3:1. However, at the lower ratios, i.e., greater gilsonite concentrations, costs factors become important and unless asphalt penetrations are relatively high, i.e., greater than 100, the greater gilsonite portions are not usually desirable. Accordingly, it is preferred that where asphalt penetrations in the preferred compositions of less than 100 dmm are used, the gilsonite ratios will be as previously noted, i.e., between about 10:1 and about 6:1, and most preferably about 9:1 by weight.

Following thorough mixing of hot asphalt and gilsonite to form the asphalt phase, it is added to the aqueous phase which comprises water and a small amount of suitable cationic emulsifying agent, preferably between about 0.1 and about 2% by weight. The amount of water used is one to achieve a final composition asphalt phase:water of between about 1:1 and 2:1 by weight, respectively. Again, it will be understood that the asphalt phase includes the gilsonite which has been prepared as previously described.

The emulsifier used is a cationic emulsifier preferably selected from the group consisting of quaternary ammonium halides, amine acetate salts and alkyl-substituted imidazolines. Quaternary ammonium halides are preferably the chloride salts of the general formula

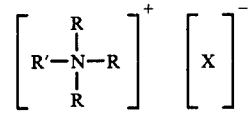

where R' group is a long alkyl chain, of between, for example, 12 and 24 carbon atoms and the remaining R groups are shorter alkyl or benzyl radical in order to impart oil solubility. The X moiety is a halide, preferably chloride or bromide, although other salts such as hydroxide, nitrate, sulfate, acetate and the like may be used. Examples of emulsifiers within this group are as follows:

cetyltrimethylammonium bromide,
cetyldimethylethylammonium bromide,
n-dodecyltrimethylammonium chloride,
n-dodecyltrimethylammonium hydroxide,
n-tetradecyltrimethylammonium chloride,
n-octadecyltri-n-butylammonium nitrate,
n-hexadecyltrimethylammonium chloride,
n-tetracosyltrimethylammonium acetate,
n-docosylpropyldimethylammonium chloride,
n-tetradecyl-n-heptyldimethylammonium chloride,
n-heptadecyldipropylmethylammonium chloride,
n-hexadecylethyldimethylammonium chloride,
n-pentadecylbenzyldiethylammonium fluoride,
n-nonadecyldiethylmethylammonium sulphate,
p-diisobutylbenzyltrimethylammonium chloride.

Commercially available compositions of this type include, for example, Hyamine 2389 (methyldodecylbenzyltrimethylammonium chloride), Aliquat 26 (monotallowtrimethylammonium chloride) or Emcol-11, an N-alkylbenzyl N, N, N - trimethyl ammonium chloride with the alkyl group averaging 12 carbon atoms, "Arquad T" and "Arquad S", $C_{14}$-$C_{18}$ trimethyl ammonium chlorides with the alkyl groups of tallow and soybean oils, respectively.

The amine acetate salt emulsifying agents are the primary aliphatic amine acetate salts sold under the trademark "Armac". These amines are derived from primary, secondary or tertiary amines in which the aliphatic groups are alkyl groups ranging from about 8 to about 18 carbon atoms.

Another preferred group of cationic emulsifiers are the alkyl-substituted imidazolines, wherein one of the alkyl groups has between 12 and 24 carbon atoms and the other substituted alkyl groups have between 1 and 4 carbon atoms. Examples of these emulsifying agents are:

1-(2-aminoethyl)-2(4-tetradecenyl)-4,5-di-n-butyl-2-imidazoline,
1-(2-aminoethyl)-2-n-octadecyl-4-ethyl-2-imidazoline,
1-(2-aminoethyl)-2-n-eicosyl-2-imidazoline,
1-(-2-aminoethyl)-2-(12-heptadecenyl)-2-imidazoline, and
1-(2-aminoethyl)-2-(5,7-heptadecadienyl)-2-imidazoline Commercial products of this type are "Nalcamines" and "Nalquats" such as Nalcamine CAE, a mixture of 1-(2-aminoethyl)-2-n-aliphatic-2-imidazolines where the aliphatic groups are heptadecenyl and heptadecadienyl. Other cationic emulsifiers may be used such as salts of primary aliphatic amines sold as "Armeens".

Preferably, the aqueous phase will have a pH of between about 4 and about 6 and preferably between about 4 and 5.5. This may be prepared by adding a sufficient amount of acid, preferably HCl. The acid may be added with the cationic emulsifier, or preferably after the emulsifier has been dissolved in the water. The gilsonite containing asphalt phase and water phase are then simply blended until thoroughly mixed. Preferably, the two phases are heated somewhat prior to mixing and blending in order to further assist the emulsion preparation. For example, the oil phase may be heated above about 200° F and up to, for example, 280° F. At the same time, the aqueous emulsifier composition may be heated up above about 150° and, for example, up to about 200° F. The two phases are then blended until substantial homogeniety is obtained.

EXAMPLE

The following composition was prepared to illustrate the emulsion of the invention. Unless otherwise specified, parts are by weight.

One part gilsonite and nine parts asphalt of a 60/70 penetration (dmm) were each separately heated to 300° F. At that temperature, the products were liquefied and were then thoroughly blended while being maintained at the 300° temperature until substantial homogeniety was obtained. Thereafter, the mixture was blended with water to yield a asphalt phase:water ratio of 2:1, the water containing cationic emulsifier Armak E-5 dodecyl trimethyl ammonium chloride in a concentration of 1% by weight of the total composition. The composition was blended and allowed to cool. It was easily applied as a sealer for asphalt pavements and was found to set within 2 hours at 60° F after which time it was no longer tacky and was available for traffic use. Because of the rapid set emulsion, the composition is also useful for roofing applications as well as others that will be evident to those skilled in the art. The composition is easy to handle, non flammable, and because of its rapid set qualities makes it highly advantageous over other sealing and coating asphalt compositions known heretofore.

I claim:

1. An asphalt emulsion composition comprising:
an asphalt phase of between about 10% and about 33% by weight gilsonite and between about 66 and about 90% by weight penetration grade asphalt having a penetration below 100 dmm at 77° F,
between about 0.1 and about 2% of a cationic emulsifying agent, and water, the ratio of asphalt phase:water being between about 1:1 and 2:1 by weight, respectively, prepared by a method comprising melting the gilsonite at a temperature of at least about 300° F, independently heating asphalt to a temperature of at least about 300° F, mixing the gilsonite and asphalt while maintaining a mixture temperature of at least 300° F, and thereafter blending asphalt-gilsonite mixture with water and emulsifying agent.

2. The composition of claim 1 wherein said asphalt has a penetration of between about 40 and about 100 dmm at 77° F.

3. The composition of claim 1 wherein said emulsifying agent comprises a quaternary ammonium halide.

4. The composition of claim 1 wherein said emulsifying agent comprises an amine acetate salt.

5. The composition of claim 3 wherein said salt comprises an alkyl amine salt wherein each said alkyl group has between about 8 and 18 carbon atoms.

6. The composition of claim 1 wherein said emulsifying agent comprises an alkyl-substituted imidazoline.

7. An asphalt emulsion composition consisting of:
an asphalt phase of between about 10% and about 33% by weight gilsonite and between about 66 and about 90% by weight penetration grade asphalt having a penetration below 100 dmm at 77° F,
between about 0.1 and about 2% of a cationic emulsifying agent, and water, the ratio of asphalt phase:water being between about 1:1 and 2:1 by weight, respectively.

* * * * *